Dec. 3, 1968 W. VON WOLFF ET AL 3,413,887
EXPANDING DOWEL OF THERMOPLASTIC MATERIAL
Filed Jan. 26, 1966 2 Sheets-Sheet 1

INVENTOR.
WOLF VON WOLFF
DIETER BERTELSMANN
BY
Bailey, Stephens & Huettig
ATTORNEYS Dec. 3, 1968   W. VON WOLFF ET AL   3,413,887

EXPANDING DOWEL OF THERMOPLASTIC MATERIAL

Filed Jan. 26, 1966    2 Sheets-Sheet 2

INVENTORS
WOLF VON WOLFF
DIETER BERTELSMANN
BY
Bailey, Stephens & Huettig
ATTORNEYS United States Patent Office 3,413,887
Patented Dec. 3, 1968

3,413,887
EXPANDING DOWEL OF THERMOPLASTIC
MATERIAL
Wolf von Wolff and Dieter Bertelsmann, Emmendingen, Baden, Germany, assignors to Max Langensiepen Kommanditgesellschaft, Emmendingen, Baden, Germany, a corporation of Germany
Filed Jan. 26, 1966, Ser. No. 523,170
Claims priority, application Germany, Jan. 30, 1965,
L 49,858
10 Claims. (Cl. 85—83)

ABSTRACT OF THE DISCLOSURE

An expanding dowel of thermoplastic material has a neck and two legs tending to spread apart from each other; a resilient member normally holds the legs in substantially parallel position, so that the dowel can be inserted through a thin wall into a hole in a thicker wall spaced from the thin wall without the possibility that the legs will spread apart and be unable to enter the hole in the thicker wall after passing through the thin wall.

---

The present invention relates to an expanding dowel for walls and the like which consists of a thermoplastic material and is provided at its front end with an annular neck part from which at least two arms extend toward the rear end, and in which the axial bore of the dowel is tapered toward the rear end as long as the arms are held in engagement with each other. When a screw is screwed into the front end of the dowel, the tough elastic material thereof is deformed and a screw thread is formed within the dowel which, when the screw is further turned, draws the latter into the dowel. Since the bore of the dowel is tapered when the dowel arms are in engagement with each other, the arms of the dowel behind the neck part will then be spread apart by the dowel screw and thereby pressed tightly against the surrounding wall material. Of course, while the screw is being turned, it is necessary in order to produce this effect to prevent the dowel from also turning within its hole in the wall and it must be held therein like a nonrotatable nut. Furthermore, in order to permit such a dowel also to be mounted in a vertical hole, for example, in a ceiling, it must also be prevented from sliding out or being pulled out of its dowel hole.

There are dowels of many different designs already known which are intended to fulfill the above requirements, for example, by being provided with gripping elements which are resiliently connected to the outer surface of the dowel and are adapted to engage intimately with the inner surface of the dowel hole in the wall into which the dowel is inserted so as to prevent the dowel from being turned and from sliding out of this hole. The resilient gripping elements which adapt themselves automatically to the diameter of the dowel hole so as to prevent the dowel from sliding out of this hole cannot, however, in most cases be made of such a solid construction that they can be relied upon not to turn within the dowel hole when the screw is tightened within the dowel. It has therefore been found advisable to design the dowels so that their arms themselves which project rearwardly from the annular neck part will be spread so as to engage with their entire outer surface with the wall of the dowel hole. Although such a dowel is secure from sliding out of its dowel hole and also from turning therein when the screw is being tightened, it has the disadvantage that it cannot be employed if between the actual dowel hole and the outer opening into which the dowel is inserted there is a gap, since the dowel arms would spread apart within this gap and thereby prevent the dowel from being inserted into the actual dowel hole. This applies, for example, to walls in which between an outer face plate and the actual solid wall a space is provided for air circulation or for heat or sound insulation, and it applies similarly also to walls which consist of a very porous concrete or of a concrete with a filling of foam plastic or of similar materials.

It is an object of the present invention to provide an expanding dowel which overcomes the above-mentioned disadvantages. The principal features of the invention for attaining this object consist in reducing the rear ends of the resilient arms of the dowel so as to have a tapered, rounded or pointed shape in order to facilitate the insertion of these ends into a dowel hole in a wall or the like, and in providing a resilient element for interconnecting these arms at a certain radial distance from each other.

More particularly it is the purpose of this resilient connecting element to limit the distance to which the dowel arms may spread apart under their own resilience to such a size that the tapered, pointed or rounded ends of these arms may be inserted without difficulty into a dowel hole which is normally made of a diameter which is approximately equal to the diameter of the dowel, that is, of both dowel arms together when they are pressed against each other. On the other hand, this connecting element is so flexible as to permit the dowel arms to be easily pressed against each other when the dowel is being inserted into such a dowell hole, and it is so resilient that, when the dowel is inserted into a wider dowel hole and the dowel screw is then screwed deeply into the dowel, the connecting element may be stretched so as to permit the dowel arms to be spread further apart than ordinarily necessary and to be clamped tightly against the wall of this wider dowel hole. The resilience of the connecting element is, however, limited so that, if the dowel has to be expanded beyond a certain diameter, the resilient connecting element will be overstrained and tear apart so that the dowel arms may then be spread further apart by the dowel screw without being restrained by the connecting element. This may occur, for example, if the dowel is inserted into a bore in a face wall which only consists of a thin plate and which is separated from the actual solid wall by a larger gap. When the dowel screw is then screwed deeply into the dowel, the resilient connecting element will be torn and under the pressure of the dowel screw the dowel arms will then be bent far apart behind the face plate like the arms of a cotter pin and will thereby hold the dowel firmly connected to this plate so as to be irremovable therefrom. If the dowel according to the invention is to be inserted into a dowel hole in a solid wall which is separated from such a face plate by a smaller gap, it is advisable to insert the dowel screw into the cylindrical neck part of the dowel so as to permit the dowel to be more securely held and guided. Since due to the resilient connecting element the dowel arms are at that time only spread slightly apart and their rear ends are also pointed, tapered or rounded, the dowel may then be easily guided and centered so that the ends of the dowel arms will enter the mouth of the dowel hole in the solid wall behind the gap. Depending upon the diameter of the dowel hole, the arms may then be pressed together when the dowel is driven into the dowel hole. Due to the tendency of the dowel arms to spread apart to a distance which is limited by the resilient connecting element, the dowel will then be held in a resilient but sufficiently firm engagement with the wall of the dowel hole so as to permit the dowel screw to be further screwed into the dowel without danger that the dowel will thereby also be turned.

The resilient element which connects the dowel arms to each other may consist, for example, of a small and relatively thin web which is moled integrally with the rear ends of the arms. This web may be formed, for example, by small tabs on the individual arms the ends of which are connected to each other by gluing or welding, or it may be integrally connected at one end to one dowel arm and be adapted to be connected at the other end by a snap connection to another dowel arm. This snap connection may be formed, for example, by providing one dowel arm with a recess, by making the free end of the web which projects from the other arm of a spherical shape and a diameter slightly larger than that of the recess, and by pressing this spherical end into the recess. This snap connection may, of course, also be formed by providing the free end of the web with an aperture into which a stud on an opposite dowel arm may be inserted. The resilient connecting element may, however, also be formed by a cap of a resilient material which surrounds and covers the ends of all arms. The outer end of this cap is preferably provided with a central pointed tip in order to facilitate the insertion of the dowel into the dowel hole. The resilient connecting element may further consist of a resilient ring which is inserted into a groove in the outer peripheral surface of the dowel arms. All of these possibilities have in common that they will limit the original or preliminary spreading of the dowel arms without interfering with the insertion of the screws into the dowels and without preventing the dowel arms from being spread further apart when necessary.

Since the dowel according to the invention is designed especially for being inserted into a dowel hole in a wall which is separated by a gap from a thin face wall or face plate, there is in such a case a considerable distance between the neck of the dowel and the surface of the bore between the dowel arms which renders it difficult to insert the dowel screw centrally into the dowel. In order to insure a proper central insertion of the dowel screw into the dowel, it is a further feature of the invention to provide the adjacent edges of the dowel arms with serrations in the form of interengaging teeth which are disposed in such a position that each tooth on one side of one arm is located diametrically opposite to a tooth gap on the other side of the same arm. If such a dowel is provided, for example, with two arms, the teeth on the edges of the arms will then embrace the dowel screw and project beyond its outer diameter toward each other so that the screw cannot pass laterally out of the dowel through the slot between the spread arms and the arms also cannot shift relative to each other. Since a tooth on one arm is located diametrically opposite to a tooth on the other arm when the dowel is being expanded, the teeth will continue to embrace the dowel screw until the dowel has been fully expanded to its normal extent as limited by the resilient connecting element and been firmly connected to the wall of the dowel hole.

According to a further feature of the invention, these serrations are provided in the form of saw teeth which are designed so as to engage like barbs into the surrounding wall material when the dowel is being expanded by the dowel screw and thereby to lock the dowel very securely within the wall.

If the material of the wall is completely solid, the outer surface of the dowel may be smooth. It will then be pressed with its entire surface against the inner surface of the dowel hole and will therefore be reliably secured in a fixed position to the wall. In normal masonry it is, however, rarely possible to produce a dowel hole so properly that its surface will intimately engage with the outer surface of the dowel at all points thereof. According to another feature of the invention, it is in such a case advisable to provide the outer surface of the dowel arms with helical grooves which extend in the same direction as the thread of the dowel screw and to arrange these grooves so as to cross the serrations at points intermediate the tips of the teeth and the tooth gaps on each side of each arm. The outwardly projecting parts between the grooves will then be pressed into the wall of the dowel hole and thereby prevent the dowel from being pulled out of the hole when a strong pull is exerted thereon. Since according to the invention these grooves extend helically between the tips of the teeth and the tooth gaps on each dowel arm, they will not reduce the strength of the dowel material at the tips of the teeth which embrace the dowel screw when the latter is screwed into the dowel.

It is, however, normally not advisable to extend these helical grooves also into the outer surface of the neck part of the dowel or into the outer surfaces of the rear ends of the dowel arms which are first inserted into the dowel hole since such deep grooves in the neck part and the projecting parts between them might lead to a destruction of the surface of the surrounding wall material, while such grooves and the intermediate projecting parts in the rear end of the dowel may render it difficult to insert the dowel into its dowel hole. According to one preferred embodiment of the invention, this rear end is preferably designed so as to form a solid hemisphere with a smooth outer surface when the dowel arms are pressed against each other. When the dowel arms are spread apart to their original position and are held in this position by the resilient connecting element, the rear end of the dowel will still be well rounded and may thus be inserted into its dowel hole without difficulty. Since this rear end is solid when during the insertion of the dowel into its dowel hole the dowel arms are pressed against each other, the dowel screw when penetrating into the dowel will force the dowel material outwardly especially at this point. If the dowel is inserted into solid masonry, the solid rear end of the dowel which is then located deeply within the wall will therefore be pressed by the penetrating screw strongly against the wall material and thereby be firmly held thereon. If, on the other hand, as previously described, the dowel is to be mounted merely on a thin plate, the resilient connecting element will be torn when the dowel screw is screwed deeply into the dowel and the dowel arms will be spread widely apart like the arms of a cotter pin so that the dowel will be prevented from being pulled out of its hole in the plate.

In order to facilitate the proper insertion of the dowel screw into the bore within the neck part of the dowel, it has been found advisable to make this bore of a cylindrical shape and the connecting part between the inner end of this bore and the bore between the dowel arms of a conical shape converging toward the latter. The dowel screw will thereby be guided in its longitudinal direction and prevented from being screwed into the dowel at an angle to its axis.

Another advantageous feature of the invention for preventing the dowel from turning when the dowel screw is being screwed into it consists in providing the dowel arms with outwardly projecting ribs which extend in the longitudinal direction of the arms and along the center of each arm. The lateral surfaces of these ribs facing in the direction in which the dowel screw is tightened extend radially to the axis of the dowel, while the other lateral surface of each rib flares toward the outer edge of the rib. The ribs therefore act like barbs in the direction in which the dowel screw is tightened and they serve as additional means for preventing the dowel from turning within its dowel hole. By extending centrally along the dowel arms, these ribs also serve to reinforce these arms.

Especially for the purpose of mounting the dowels in walls of a soft material, it is another feature of the invention to provide the outer side of the neck part of each dowel with radial projections which extend in the longitudinal direction of the dowel and serve as additional means for preventing the dowel from turning. Since according to the invention this neck part is made of a cylindrical shape and of a diameter in accordance with the maximum diameter of the shank of the dowel screw so that this neck part will not expand when the dowel screw is screwed into the dowel, such projections cannot cause any breaking of the surface of the wall material which surrounds the dowel. For the purpose of giving the dowel a clean outer finish and to cover the outer edge of the dowel hole, and for insuring at the same time that the dowel will not be inserted too deeply into the dowel hole, it is a further feature of the invention to provide the front end of the neck part of the dowel with an outwardly projecting flange or collar.

The features and advantages of the present invention will become more clearly apparent from the following detailed description thereof which is to be read with reference to the accompanying drawings, in which:

FIGURE 4 shows a cross section which is taken along the line IV—IV of FIGURE 1; while

Figure 1:
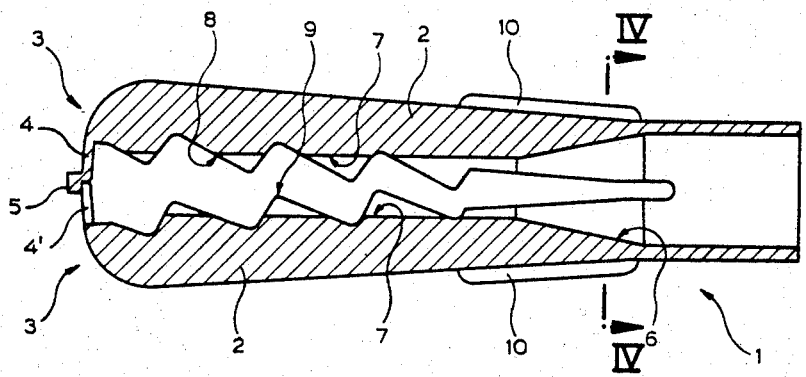
FIGURE 1 shows a longitudinal section of an expanding dowel according to a first embodiment of the invention.

The expanding dowel according to the invention as illustrated in FIGURE 1 consists of a thermoplastic material and its front end is provided with a neck part 1 from which a pair of arms 2 extend which gradually increase in thickness toward the rear end 3. On this rear end 3, a pair of connecting tabs 4 and 4' are molded integrally on the arms 2 so as to project toward each other, and the end of these tabs are connected to each other at 5, for example, by welding or gluing. These connected tabs 4 and 4' close the rear end of a bore 7 which, when the arms 2 engage with each other along their longitudinal edges, has a conical shape tapering toward the rear end 3. The bore 7 in the neck part 1 of the dowel is substantially cylindrical and merges by a conical part 6 into the main bore 7 of the dowel. The opposite edges 8 of the two arms 2 are serrated and provided with saw teeth which, when the dowel is in its compressed position, interengage with each other. The tips of these teeth then project beyond the central axis of bore 7 and prevent the dowel screw from penetrating through the slot between the edges of the adjacent dowel arms when the screw is being screwed into the dowel. The outer surface of each arm 2 is further provided with a longitudinal rib 10 which extends centrally thereof and reinforces the respective arm. These reinforcing ribs 10 have straight forwardly inclined faces 21 and curved faces 22 and are thus barb-shaped in cross section, as seen from the front end of the dowel, so as to prevent the dowel from turning within its dowel hole in the direction in which the dowel screw is screwed into the dowel.

The resilient web-shaped connecting element which is formed by the tabs 4, 4', 5 at the rear end of the dowel prevents the arms 2 from spreading apart beyond a certain distance from each other and thus permits the dowel to be inserted without difficulty into the dowel hole in a wall or the like. This connecting element does not, however, prevent the desired preliminary spreading effect of the arms 2 since, when the latter are inserted into the dowel hole, they are normally pressed against each other by the wall of this hole and can therefore also press tightly against this wall without being hindered by the connecting element 4, 4', 5.

Figure 2:
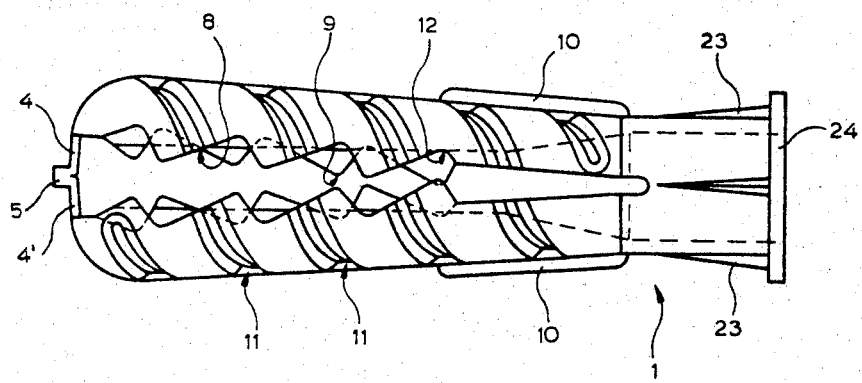
FIGURE 2 shows a side view of a modification of the invention, in which the outer surface of the dowel is provided with helical grooves.

FIGURE 2 illustrates a modification of the invention, in which the dowel is provided with helical grooves 11 similar to screw threads which intersect the serrations 8 between the tips 9 and the gaps 12 of the teeth. This particular arrangement of the grooves 11 prevents them from reducing the strength of the tips 9 of the teeth which embrace the dowel screw when the latter is screwed into the dowel after it has been inserted into its dowel hole in a wall. Furthermore, the provision of these grooves 11 also insures that the outer surfaces of the dowel between the grooves will then be firmly pressed into the surrounding material of the wall so that the dowel will be rigidly secured thereto and prevented from being pulled out of its dowel hole. Of course, the helical grooves 11 should extend in the same direction as the screw thread of the dowel screw. This dowel has an annular neck 24 with grooves 23.

Figure 3:
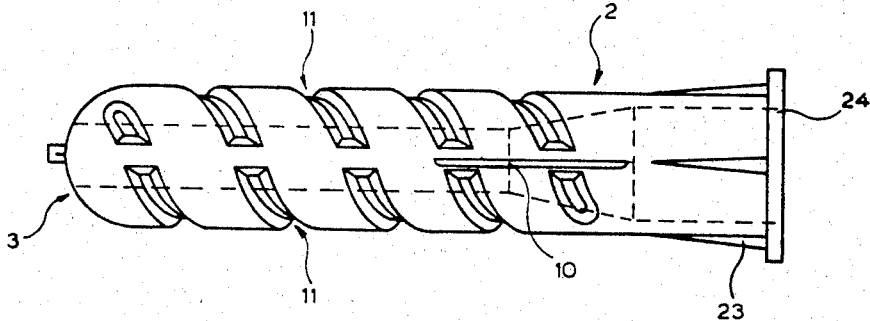
FIGURE 3 shows another side view of the dowel according to FIGURE 2 after being turned at an angle of 90° about its axis.
Figure 4:
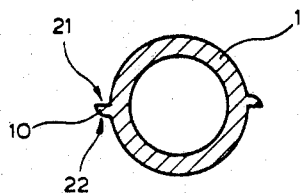
Figure 5:
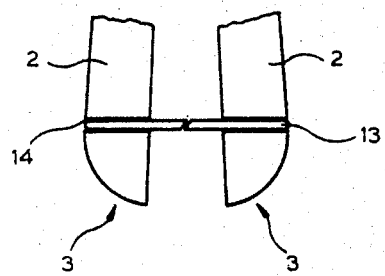
FIGURES 5 and 8 show different embodiments of the resilient element which connects the dowel arms to each other.
Figure 6:
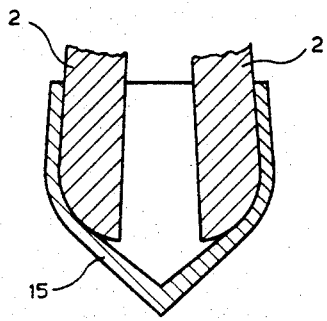

FIGURE 3 illustrates the dowel according to FIGURE 2 in a position in which it is turned about its longitudinal axis at an angle of 90° relative to its position as shown in FIGURE 2. It clearly shows that one of the ribs 10 extends for a certain distance along the center of each arm 2 in the longitudinal direction of the dowel, and it also shows that when the dowel arms are pressed against each other the rear end of the dowel 2 has a hemispherical shape which permits this end 3 to be easily inserted into the dowel hole, even when the dowel arms are in their spread condition as shown in FIGURES 1 and 2. This figure also shows that the grooves 11 are discontinuous at one point in each half turn.

Figure 7:
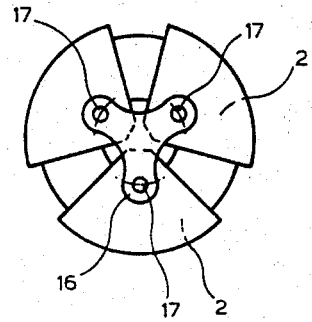
Figure 8:
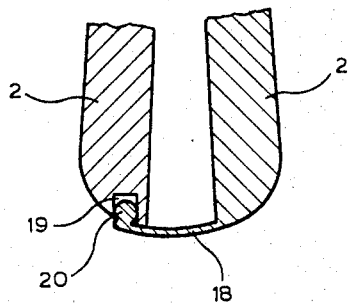

FIGURES 5 to 8 illustrate several modifications of the resilient element which connects the dowel arms to each other. According to FIGURE 5, this connecting element consists of a spring ring 13 which is made of a resilient material and is inserted into a groove 14 in the arms 2 near the rear end 3 of the dowel. When a screw is being screwed into the dowel, this spring ring 13 will expand and thereby permit the arms 2 to be spread apart. According to FIGURE 6, the connecting element consists of a cap 15 of a resilient material which is fitted over the arms 2 so as to cover the rear end of the dowel completely. The tip of the cap 15 is pointed so as to permit the dowel to be easily inserted into the dowel hole in a wall or the like. FIGURE 7 shows a rear-end view of another dowel which is provided with three arms 2 and with a connecting element 16 of a resilient material which is connected to the rear end of these arms. This connecting element 16 is for this purpose provided with bores into which the short pins 17 engage which project from the rear ends of the arms 2. FIGURE 8 finally illustrates another possibility of connecting the two dowel arms 2 resiliently to each other. The rear end of one of these arms has a web 18 molded thereon which extends toward the other arm and has a spherically enlarged end 20 on its side facing the dowel. This spherical end 20 may be pressed into an aperture 19 of a corresponding size in the end of the other arm 2 so that the web 18 will connect the two arms resiliently to each other.

Although our invention has been illustrated and described with reference to the preferred embodiments thereof, we wish to have it understood that it is in no way limited to the details of such embodiments but is capable of numerous modifications within the scope of the appended claims.

Having thus fully disclosed our invention, what we claim is:

1. An expanding dowel of thermoplastic material adapted to be mounted within a dowel hole in a wall or the like, comprising an annular neck part and at least two substantially straight arms projecting from said neck part toward the rear end of the dowel, said dowel having an axial bore adapted to receive a dowel screw and tapering toward the rear end of the dowel when said dowel arms are pressed into engagement with each other, said arms tending to spread apart under their own resilience, characterized by a resilient flexible yieldable means operatively connected to both said arms adjacent the free ends thereof for normally holding said arms in position substantially parallel to each other but spaced from each other, the rear ends of said arms having a reduced size so as to permit them to be inserted in said positions into a dowel hole of a diameter substantially equal to the diameter of said dowel arms when pressed against each other, said yieldable means permitting said arms to be spread further apart when a screw is threaded into the dowel.

2. An expanding dowel as claimed in claim 1, in which said yieldable means comprises a web having a thickness considerably smaller than the thickness of each dowel arm and molded together with the rear end of said dowel and firmly connected to said dowel arms.

3. An expanding dowel as claimed in claim 2, in which said web is formed by a tab on each of said dowel arms and molded at one end together with the rear end of one of said arms, the other ends of said tabs being connected to each other.

4. An expanding dowel as claimed in claim 2, in which said web is secured at one end to at least one of said dowel arms, and associated snap connection means on the other end of said web and at the other dowel arm for connecting said web to said other dowel arm.

5. An expanding dowel as claimed in claim 1, in which said yieldable means comprises a cap of resilient material enclosing the rear ends of said dowel arms.

6. An expanding dowel as claimed in claim 5, in which said cap has a central pointed end facing in the direction in which said dowel is to be inserted into a dowel hole.

7. An expanding dowel as claimed in claim 1, in which said dowel arms have a groove in the outer surface near the rear ends thereof, said yieldable means comprising a resilient ring which is inserted into said groove and surrounds said arms.

8. An expanding dowel as claimed in claim 1, in which the adjacent longitudinal edges of said dowel arms outside of said axial bore are provided with coarse serrations which interengage with each other when said dowel arms are pressed against each other, the tip of each tooth of said serrations on one side of each dowel arm being located diametrically opposite to a tooth gap on the other side of the same dowel arm.

9. An expanding dowel as claimed in claim 8, in which said serrations on each dowel arm are provided in the form of saw teeth.

10. An expanding dowel as claimed in claim 8, in which the outer surface of said dowel is provided with helical grooves, said grooves intersecting said serrations at points intermediate the tips and the adjacent gaps of said teeth, said grooves being discontinuous at one point in each half turn.

References Cited

UNITED STATES PATENTS

| | | | |
|---|---|---|---|
| 3,315,558 | 4/1967 | Fischer | 85—80 |
| 1,352,494 | 9/1920 | Zifferer | 85—72 |
| 2,172,125 | 9/1939 | Hamill | 85—83 |
| 3,022,701 | 2/1962 | Potruch | 85—83 |
| 3,104,582 | 9/1963 | White | 85—89 |
| 3,171,321 | 3/1965 | Fischer | 85—83 |
| 3,187,620 | 6/1965 | Fischer | 85—83 |
| 3,313,745 | 10/1965 | Dwyer | 85—80 |
| 3,213,746 | 10/1965 | Dwyer | 85—80 |
| 3,232,163 | 2/1966 | Croessant | 85—83 |

FOREIGN PATENTS

| | | |
|---|---|---|
| 1,381,750 | 11/1964 | France. |
| 1,373,580 | 8/1964 | France. |
| 705,398 | 4/1941 | Germany. |
| 1,143,772 | 2/1963 | Germany. |

MARION PARSONS, JR., *Primary Examiner.*